Patented Jan. 9, 1940

2,186,271

UNITED STATES PATENT OFFICE 2,186,271

CUTTING OIL

Ernest Frank Pevere, Beacon, N. Y., assignor to The Texas Company, New York, N. Y., a corporation of Delaware No Drawing. Application June 25, 1936, Serial No. 87,260

2 Claims. (Cl. 87—9)

This invention relates to lubricants and has to do particularly with the manufacture of cutting oils.

In the preparation of cutting oils heretofore it has been customary to sulfurize a portion of the mineral oil ingredient or some extraneous material with free sulfur and then incorporate the resultant sulfur base so formed into the oil to be sulfurized. Such a procedure frequently produces a product which is very corrosive and unstable with respect to color and sludge formation. It is an object of the present invention to produce a cutting oil which is free from these objections and containing a sulfur ingredient which is stable and contains a sulfur content which renders the cutting oil effective for the purpose intended.

In accordance with the present invention, there is provided in the oil, in proper proportions, an organic polysulfide which may be represented by the general formula R—$S_n$—R, wherein R represents an organic aliphatic or aromatic radical and $n$ represents the number of sulfur atoms which is greater than 2 and preferably 4 or more. I prefer to use organic polysulfides containing more than 2 sulfur atoms in the molecule, preferably at least 4, and possibly 5 or more. In case R is an alkyl substituent, such a substituent may be methyl, ethyl, propyl, butyl and higher homologs. Aryl or aralkyl substituents which are contemplated include phenyl, tolyl, xylyl and other homologs of the benzene series. While I have indicated in the above formula that the two substituents represented by R are the same or, in other words, that the sulfide is a symmetrical polysulfide, nevertheless I may use compounds which are unsymmetrical or wherein the two substituents are unlike; for example, unsymmetrical ethyl-tolyl or phenyl-tolyl polysulfide.

The amount of the polysulfide which is added to the lubricating oil may range between about 1–10%, preferably around 2–5%. I have prepared sulfur cutting oils containing approximately 2 and 7% with good results. As an example, in one case 7½% of tolyl tetrasulfide was added to 100 viscosity lubricating oil. The resulting product had a light color and showed excellent properties as a cutting fluid.

The lubricating oil constituent may be any good grade of lubricating oil commonly used for the purpose. In the preparation of cutting oils, I have used an oil of about 100 viscosity Saybolt Universal, but any oil such as commonly used for making cutting oils, for example one having a viscosity between about 70 and 120 seconds at 100° F. Saybolt Universal, may be used.

The advantage of the present invention is that sulfur may be incorporated in the oil without changing the characteristics of the original oil, such as color and viscosity. Also the sulfur is incorporated in the form of a compound which is readily soluble in the oil even at room temperature and imparts no odor or corrosiveness or other undesirable properties to the oil to which it is added.

Obviously many modifications and variations of the invention, as hereinbefore set forth, may be made without departing from the spirit and scope thereof, and therefore only such limitations should be imposed as are indicated in the appended claims.

I claim:

1. A cutting oil comprising a light mineral lubricating oil having a viscosity within the range generally employed for the lubrication of cutting tools of the order of about 70 to 120 seconds at 100° F. Saybolt Universal, and about 2–10% by weight on the weight of the mineral lubricating oil of an organic polysulfide having the formula $R_1$—$S_n$—$R_2$, wherein $R_1$ and $R_2$ represent the same or different alkyl, aryl or aralkyl radicals selected from the group consisting of methyl, ethyl, propyl, butyl, phenyl, tolyl and xylyl, and $n$ represents the number of sulfur atoms which is greater than 2.

2. A cutting oil according to claim 1, in which the organic polysulfide is tolyl tetrasulfide.

ERNEST FRANK PEVERE.